United States Patent
Yeo et al.

(10) Patent No.: US 6,870,573 B2
(45) Date of Patent: *Mar. 22, 2005

(54) METHOD AND APPARATUS FOR DYNAMICALLY GENERATING A VISUAL PROGRAM SUMMARY FROM A MULTI-SOURCE VIDEO FEED

(75) Inventors: Boon-Lock Yeo, Sunnyvale, CA (US); Minerva Ming-Yee Yeung, Sunnyvale, CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/235,783

(22) Filed: Jan. 22, 1999

(65) Prior Publication Data

US 2002/0070958 A1 Jun. 13, 2002

(51) Int. Cl.$^7$ .................................................. H04N 5/50
(52) U.S. Cl. ........................ 348/569; 348/564; 348/565; 725/41
(58) Field of Search ................................. 348/569, 570, 348/564, 906, 731, 732; 725/41, 43, 48, 56, 59; 345/327

(56) References Cited

U.S. PATENT DOCUMENTS

| | | | | |
|---|---|---|---|---|
| 5,144,438 A | * | 9/1992 | Kim ............................. | 725/56 |
| 5,161,019 A | * | 11/1992 | Emanuel ...................... | 725/56 |
| 5,194,954 A | * | 3/1993 | Duffield ....................... | 725/56 |
| 5,343,250 A | * | 8/1994 | Iwamura ...................... | 348/564 |
| 5,479,267 A | * | 12/1995 | Hashimoto ................... | 386/83 |
| 5,485,611 A | * | 1/1996 | Astle .......................... | 348/564 |
| 5,537,152 A | * | 7/1996 | Ishikawa ..................... | 348/564 |
| 5,737,029 A | * | 4/1998 | Ohkura et al. ............. | 348/564 |
| 5,815,145 A | * | 9/1998 | Matthews, III ............. | 345/327 |
| 5,818,439 A | * | 10/1998 | Nagasaka et al. ........... | 345/327 |
| 5,900,868 A | * | 5/1999 | Duhault et al. ............. | 345/327 |
| 5,907,323 A | * | 5/1999 | Lawler et al. .............. | 345/327 |
| 5,974,218 A | * | 10/1999 | Nagasaka et al. ............. | 386/46 |
| 6,295,646 B1 | * | 9/2001 | Goldschmidt Iki et al. ... | 725/41 |

* cited by examiner

*Primary Examiner*—John Miller
*Assistant Examiner*—Trang U. Tran
(74) *Attorney, Agent, or Firm*—Blakely, Sokoloff, Taylor & Zafman LLP

(57) ABSTRACT

A method of generating a visual program summary is disclosed for a multiple source video feed. In the disclosed method, a computing device continuously captures frames from a set of available video feeds such as television channels. The computing device analyzes the captured video frames to remove redundant frames. The computing device then selects a set of frames to generate a visual program summary. The selected frames are composited together to generate a visual program summary.

33 Claims, 10 Drawing Sheets

METHOD AND APPARATUS FOR DYNAMICALLY GENERATING A VISUAL PROGRAM SUMMARY FROM A MULTI-SOURCE VIDEO FEED

FIELD OF THE INVENTION

The present invention relates to the field of television systems. In particular the present invention discloses a system for dynamically generating a visual program summary for an environment with multiple video feeds.

BACKGROUND OF THE INVENTION

Current cable and direct satellite television services offer sixty to one hundred and fifty different channels of television programming content. Newer digital television services promise even greater numbers of channels such as a five-hundred (500) channel television service. Furthermore, viewers may soon received television signals from a number of different sources such as terrestrial broadcast analog television, terrestrial broadcast digital television, cable television, and Internet delivered video. As the amount of television and video programming available increases, the demand for improved television channel directories and navigation tools has grown.

"Channel surfing" is one of the most popular methods of navigating current analog cable television or satellite digital television (such as DirecTV) services. A television viewer that is channel surfing typically performs the following steps:

(1) The viewer turns on the television system;
(2) the viewer examines the currently displayed television program on the currently tuned television channel for a few seconds;
(3) if the television program on the current channel appears interesting, then the viewer leaves the television tuned to the current channel and starts viewing the program; and
(4) if the viewer does not find the television program on the current channel to be interesting, the viewer switches to the next channel using the "channel up" button and returns to step (2).

Such a channel surfing navigation method requires too much time to scan through the available programs in order to locate a desirable program. For example, in a typical cable television environment with approximately seventy (70) channels, viewers that analyze each television channel for a few seconds will require several minutes of navigation to locate a desirable television program. Furthermore, the few seconds of viewing each channel during the scan does not provide the television viewer with much information about the content of the television program currently being broadcast.

The channel surfing method is also greatly hampered by commercial advertisements. Specifically, commercial advertisements do not provide any hint as to the content of the television program that is currently being broadcast. Thus, a channel surfing viewer must attempt to remember the channels that were displaying commercial advertisements when the viewer scanned by such channels. The viewer can check such channels at a later time in attempts to examine the program that is being broadcast. However, the viewer will mostly likely forget which channels were displaying commercial advertisements such that the viewer does not receive input on all the possible television channels to view.

Another method of navigating through a large number of channels is to display a program guide channel. Most cable television systems now reserve at least one channel for broadcasting a television based program grid that provides a graphical grid display of the current television programs available. The two-dimensional grid is typically created with a vertical axis that lists several rows of available channels and a horizontal axis that lists viewing times. A television viewer tunes in the program guide channel and then scans though the television program listings on each channel for the viewing time in order to locate a television program that the viewer wishes to view. The viewer then tunes in the appropriate channel for the desired television program.

Such television programming grid based systems are severely limited in that only a very small amount of information about the each television program is displayed. In most television programming grid-based systems, only a short textual television program title and a television program rating symbol are displayed. Such limited program information often does not provide the television viewer with a sufficient understanding of the television program. For example, a television program series is usually only labeled with the title of the television program series. To determine which particular series episode is currently being broadcast, the viewer must tune in the channel and make a determination.

In summary, the current navigation methods and television program guides do not provide viewers with enough information to quickly make informed television program selections. It would therefore be desirable to have improved methods of displaying information about the available television programming.

SUMMARY OF THE INVENTION

The present invention introduces a new method and apparatus for displaying information about available video programming. The method captures a set video frames from a set of available video feeds over a period of time. The method then generates a visual program display, the visual program display comprising a plurality of video frames from the captured video from the available video feeds.

Other objects, features, and advantages of present invention will be apparent from the company drawings and from the following detailed description.

BRIEF DESCRIPTION OF THE DRAWINGS

The objects, features and advantages of the present invention will be apparent to one skilled in the art, in view of the following detailed description in which.

DETAILED DESCRIPTION OF THE PREFERRED EMBODIMENT

A method and apparatus for dynamically generating a visual program summary in a multiple source video environment is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to personal computer based hardware implementation. However, the same techniques can easily be applied to other types of implementations such as set-top boxes, digital appliances, home servers, and built-in television circuitry.

Visual Program Summary Device

To provide viewers with sufficient amount of information to make an informed television program selection, the present invention introduces a dynamic visual program summary. The dynamic visual program summary provides images of non-redundant image frames. Specifically, a computing device constantly tunes in the available television channels in a sequential manner to captures image information from each channel. The captured image frames provide a visual representation of the content displayed on the available channels in the recent past. Redundant image frames are discarded. The captured image frames are used to create a dynamic visual program summary that provides viewers with a good overview of the television program content recently broadcast. With the dynamic visual program summary, television viewers are able to make smarter television viewing choices in a shorter period of time.

Figure 1B:
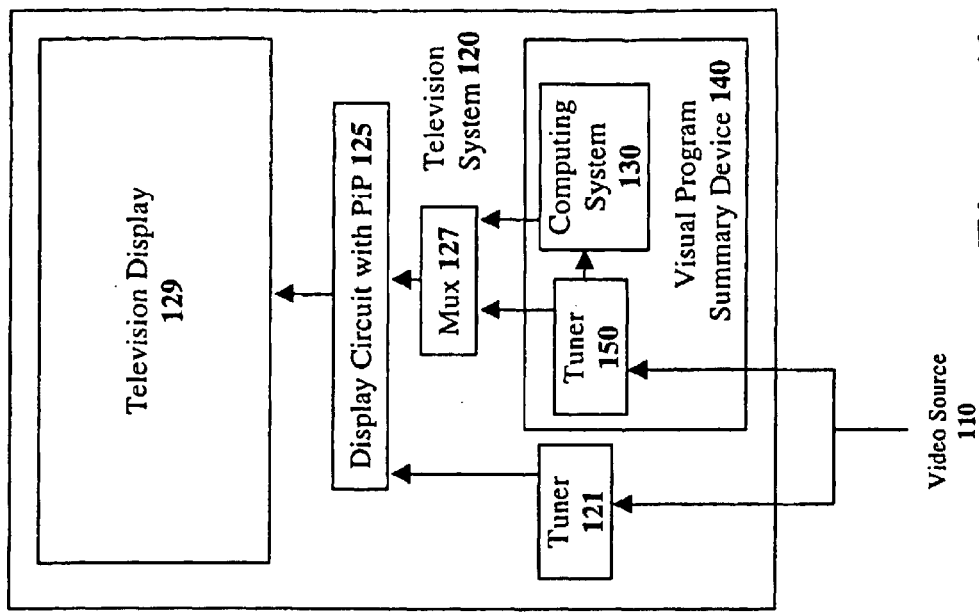
FIG. 1b illustrates a block diagram of a second possible arrangement that implements the teachings of the present invention within a digital television system.
Figure 1A:
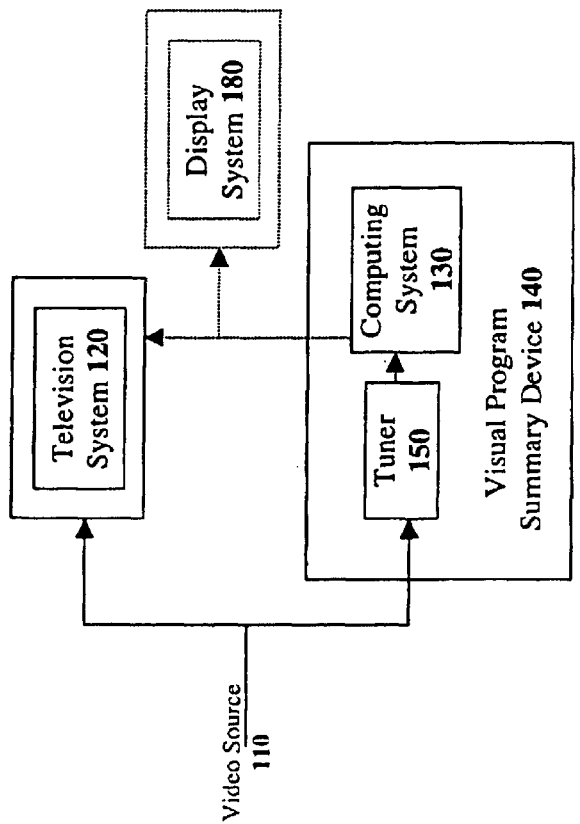
FIG. 1a illustrates a block diagram of one possible arrangement that implements the teachings of the present invention in a separate computer system device.

FIG. 1a illustrates one possible embodiment that uses the teachings of the present invention. In the embodiment of FIG. 1a, a video-input source 110 is coupled to a television 120 and to a visual program summary device 140. The video-input source 110 may be an antenna, a satellite television dish receiver system, a cable television feed, an internet based video feed, or any other source of multiple video programs. The visual program summary device 140 is a device that generates a visual television program summary for viewers. The visual program summary device 140 contains a television tuner than is used to tune in the different television programs available to the viewer. The visual program summary device 140 also includes a computing device 130 for analyzing the available programs.

The computing device 130 includes most of the typical components in a personal computer system such as a processor, short term memory, long term storage, and input/output functions. The computing device 130 may be a personal computer, a set-top box, or a computing appliance. The computing device 130 generates a display signal that may be passed to the television system 120 or to an external display system such as display system 180. The display is used to display a visual summary of available television programming generated by the computing device 130.

In an alternate embodiment illustrated in FIG. 1b, the visual program summary device 140 is built into the television system directly. In such an embodiment, the same tuner circuitry 150 can be used for both the visual program summary device 140 and another function such as a "picture-in-picture" (PiP) feature.

Hardware Architecture

Figure 2A:
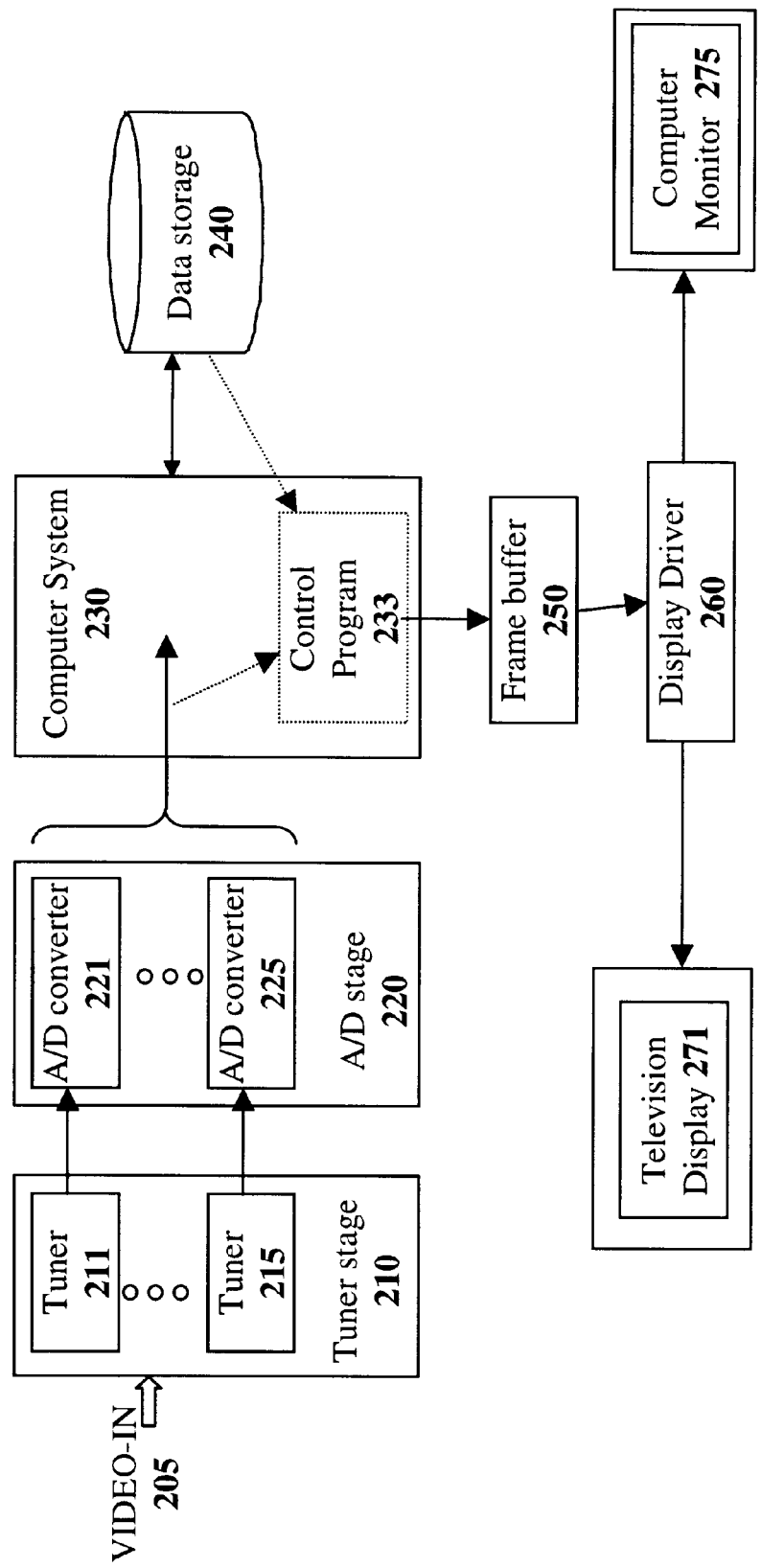
FIG. 2a illustrates a block diagram of an analog television embodiment of a television program summarizing system.

FIG. 2a illustrates a block diagram of a first embodiment of a visual program summary device. Starting from the video source input 205, the visual program summary device begins with a television tuner stage 210. The television tuner stage 210 is used to tune in a particular television program/channel delivered on the video input 205. In an analog television environment, the television tuner stage 210 tunes in NTSC or PAL video signals. The tuned analog television output from the television tuner stage 210 is then digitized by an Analog to Digital (A/D) converter stage 220. The A/D converter stage 220 outputs digital television image frames that may be captured by computer system 230.

In a simple embodiment, only one television tuner circuit 211 and A/D converter 221 pair is required. The single television tuner circuit 211 is shared using time division multiplexing. In a more sophisticated embodiment, the system of the present invention may incorporate multiple television tuners and multiple A/D converters. A system with multiple television tuners and multiple A/D converters provides for denser frame-capture in temporal domain. As set forth with reference to FIG. 1b, the additional television tuners and A/D converters also enable features such as Picture-in-Picture or Summary-in-Picture functions.

Figure 2B:
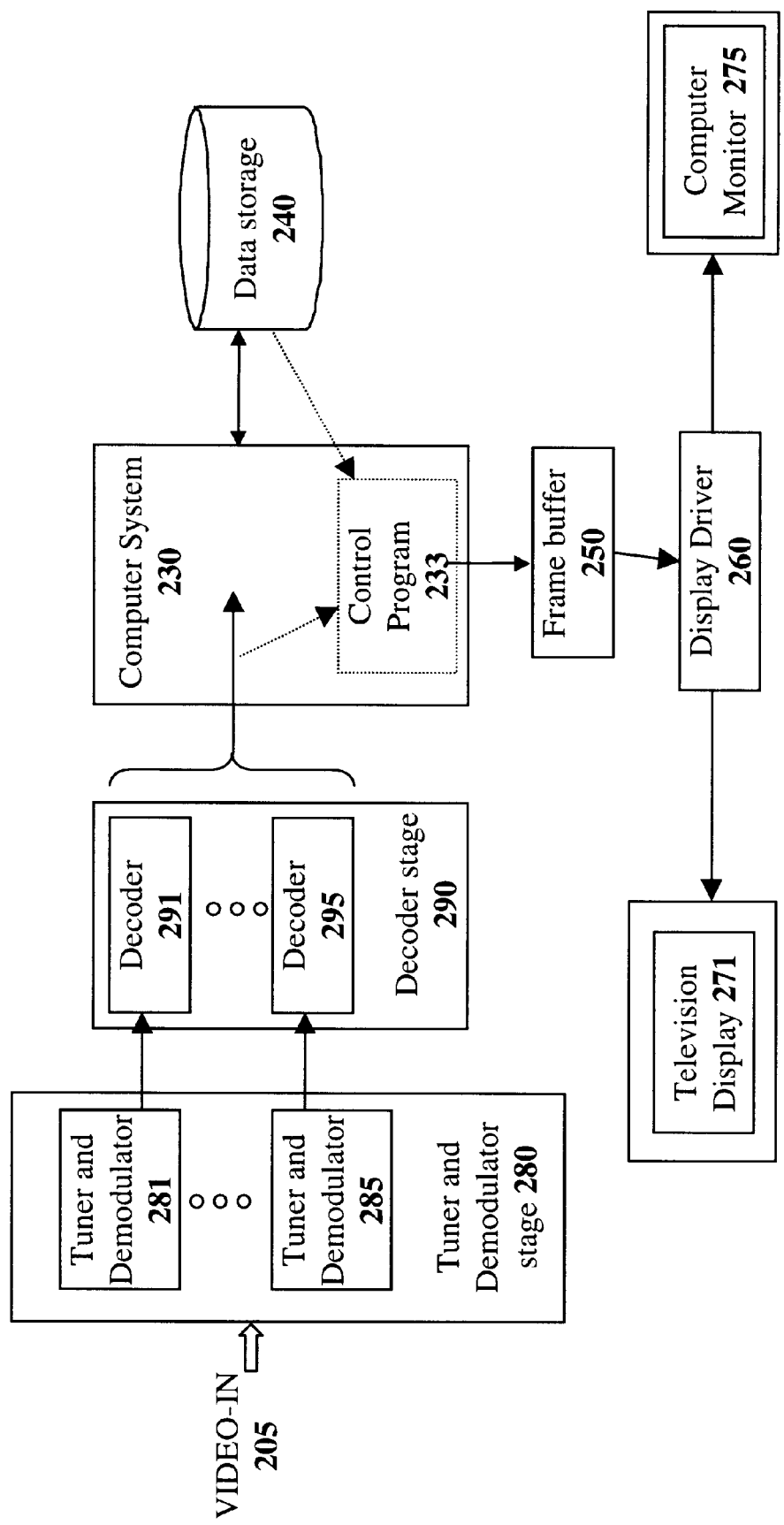
FIG. 2b illustrates a block diagram of a digital television embodiment of a television program summarizing system.

The tuner stage 210 and A/D converter stage 220 of FIG. 2a are required only for analog television embodiments. FIG. 2b illustrates one possible embodiment for a digital television-based visual program summary device. In the digital television-based embodiment of FIG. 2b, the tuner stage and A/D converter stage have been replaced with a tuner/demodulator stage 280 and a decoder stage 290. The tuner/demodulator stage 280 tunes in digital television signals and demodulates the signal to access digital television packets. The decoder stage 290 decodes the digital television packets to render digital television frames that are output to a computer system 230. It should be noted that in a digital television embodiment, such as the digital television embodiment of FIG. 2b, the visual program summary device might take advantage of extra program information embedded within the digital signal such as program titles.

In an Internet based embodiment (not shown), no tuner is required at all. Instead, a stream of packets representing video information is passed directly to the computer system of the visual program summary device such that the computer system decodes the video streams. Alternatively, a dedicated video decoder may be used to ease the computing load of the computer system in such an Internet based embodiment. In such an Internet-based system, the visual program summary device may scan a set of different video feeds and generate a program summary based on those video feeds. For example, the visual program summary device may monitor a number of different multicast streams carrying video and generate a visual program summary based upon those multicast video feeds.

The various different video source embodiments may be combined into a single system such that multiple different video channels from multiple different video sources may be monitored. Specifically, in a very advanced embodiment, the visual program summary device may monitor all the available video feeds from multiple different sources by using a plurality of different frame capturing front-end systems. For example, in a home with a digital television satellite receiver and an Internet connection, the visual program summary device may monitor all the channels received over the digital television satellite receiver, all the channels broadcast over terrestrial broadcast television, and all the video feeds available on the Internet connection to generate a master visual program summary.

The computer system 230 in FIGS. 2a and 2b processes the received digital television information. The computer system consists 230 of a processor, memory, and input/output circuitry as is well known in the art. As depicted in the embodiment of FIG. 1a, the computer system 230 may be a typical personal computer system. The computer system 230 may store information such as digital television frames and video segments on a data storage device 240 such as a hard-disk drive.

A control program 233 controls the computer system 230. The control program 233 determines which television frames are captured and stored in the data storage 240. The control program 233 selects and composites captured television frames to create a visual program summary display in frame buffer 250. The visual program summary display in frame buffer 250 may be displayed on a computer monitor 275 using a display driver 260. Alternatively, the visual program summary display in frame buffer 250 may be displayed on the viewer's television screen 271 using the display driver 260.

Visual Program Summary Control Program

Figure 3:
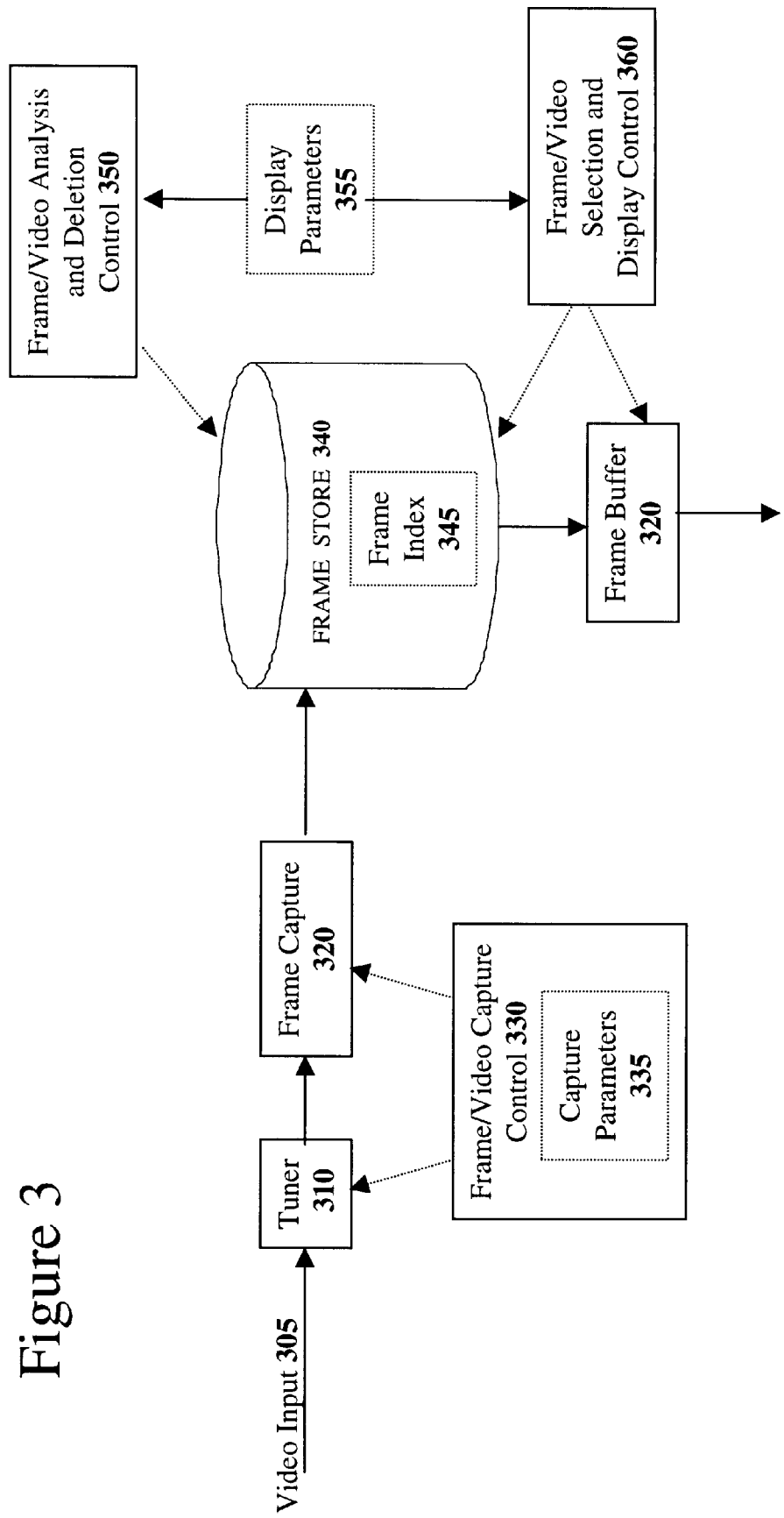
FIG. 3 illustrates a conceptual diagram of a control program for a visual program summary device.

Referring to FIGS. 2a and 2b, the control program 233 is responsible for capturing digital video frames, analyzing those digital video frames, and then compositing selected digital video frames into a visual program summary display. FIG. 3 provides a conceptual diagram that describes the operation of the control program in greater detail. Referring to FIG. 3, the operations of the control program have been divided into three main tasks: frame/video capture, frame/video analysis, and program summary generation. Each task will be described individually. However, it should be noted that all three tasks could be implemented using a single-threaded computer program, a multi-threaded computer program, three individual programs running as separate processes, or any other task division arrangement.

Frame/Video Capture

To create a video program summary, the control program first captures video frames from the available programs. Referring to FIG. 3, a frame/video capture control module 330 performs the task of capturing video frames. The frame/video capture control module 330 controls the television tuner 310 to select a particular television channel and directs a frame capture unit 320 to capture television frames. The captured video frames are stored onto a frame store 340. The frame store 340 includes a frame index 345 that lists all the frames that are currently available on the frame store 340.

To determine which television frames should be captured, the frame/video capture control module 330 uses a set of predefined capture parameters 335. The capture parameters 335 are set in a manner that depends upon the available resources. For example, the capture parameters 335 must limit the amount of television frames captured depending upon the size of the frame storage 340. Furthermore, the capture parameters 335 are also set in a manner that depends on the preferences of the viewer that will be using the visual program summary device.

Figure 4:
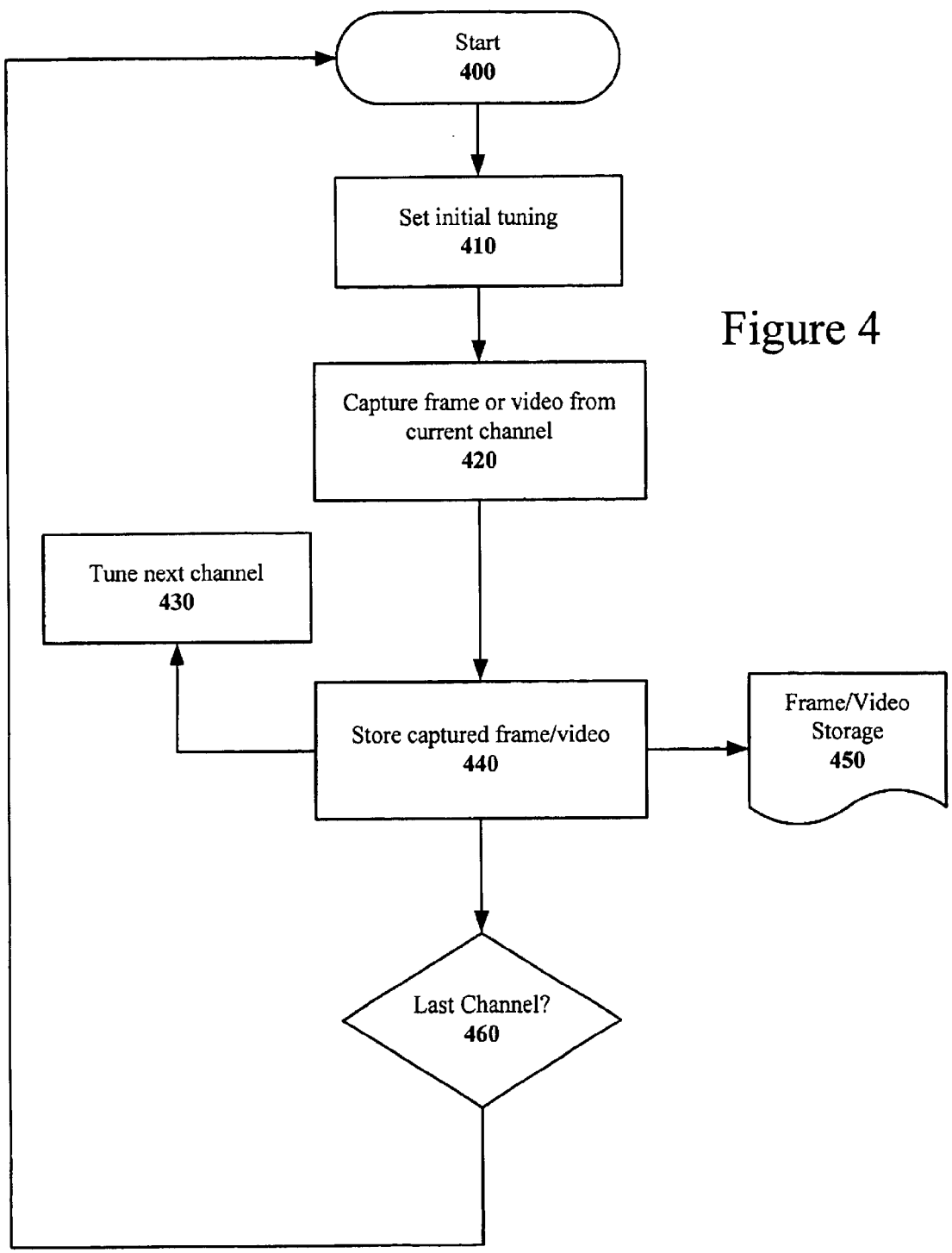
FIG. 4 illustrates a flow diagram that describes one embodiment of how television images may be captured.

FIG. 4 illustrates a flow diagram that describes the operation of one simple embodiment of a frame/video capture control module. The simple embodiment of FIG. 4 merely cycles through the available channels and captures an image from each channel. Referring to FIG. 4, the frame/video capture control module first sets the tuner to an initial tuning frequency for a first channel at step 410.

Next, at step 420, the frame/video capture control module captures a video frame or a set of video frames. In one embodiment, only individual still video frames are captured. In an alternate embodiment, the frame/video capture control module captures small sections of video. After the still video frame or short video (frame/video) has been captured, the frame/video capture control module stores the frame/video into the frame storage device at step 440. Referring back to FIG. 3, the frame/video capture control module updates the frame index 345 that provides an organized index of all the frames and video segments that have been stored onto the frame store 340.

Referring again to FIG. 4, at step 460 the frame/video capture control module determines if the currently tuned channel is the last television channel available. If it is not the last channel, the frame/video capture control module proceeds to step 430 where the frame/video capture control module adjusts the tuner to tune in the next available channel.

If the frame/video capture control module was at the last channel, then the frame/video capture control module moves back to step 410 to tune in the first channel. After tuning in a next channel or returning to the initial channel, the frame/video capture control module repeats the steps of capturing and storing frames. It should be noted that the television channels that will be examined might be configured such that a viewer may eliminate channels that the viewer is not interested in. For example, the viewer may eliminate foreign language channels.

In a single tuner environment with C different channels, the frame/video capture control module will only be able to capture a frame from each channel every C*(amount of time to capture a frame) seconds. Thus, a single tuner may naturally limit the frame samples captured.

Figure 5:
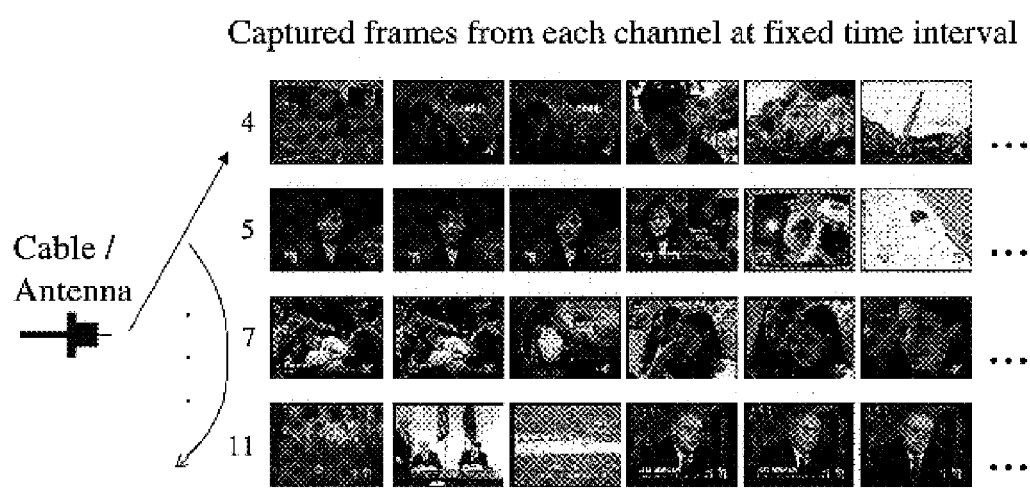
FIG. 5 illustrates a series of frames captured from a set of available television program channels.

FIG. 5 graphically illustrates one example of what the frame/video capture control module embodiment described in FIG. 4 may capture. Referring to FIG. 5, the frame/video capture control module scans through the available channels and captures a frame from each channel. In the example of FIG. 5, the local television market contains television signals on channels 4, 5, 7, and 11 (Other channels may also exist but are not shown). All the channels are currently broadcasting newscasts. The frame/video capture control module sequentially scans through the available channels and captures a frame from each television channel. Thus, FIG. 5 illustrates four rows of image frames wherein each row consists of image frames captured from the same channel but at different times.

In one embodiment, the frame/video capture control module may examine each channel for a few seconds when capturing content. If the frame/video capture control module determines that the content is relatively static, then a single representative frame may be captured. However, if the frame/video capture control module determines that significant activity is occurring, then the frame/video capture control module may elect to capture a short video but capturing a series of image frames. In one embodiment, the frame/video capture control module will determine if significant activity is occurring using the color histograms of successive image frames. If the color histograms of successive frames vary in a significant manner then the frame/video capture control module may capture successive image frames to capture a video. Thus, for example, if an explosion is displayed then the frame/video capture control module will capture a series of images to display the explosion.

Frame/Video Analysis and Deletion

Referring back to FIG. 3, the frame/video capture control module 330 continuously stores new frames and videos into the frame store 340. As time passes, the frames and video being stored into the frame store 340 will quickly fill up the space available on the frame store 340. To prevent the overflow of the frame store 340, the control program must continuously delete some of the information being stored on the frame store 340. To limit the information stored on the frame store 340 the control program uses a frame/video analysis and deletion control module 350 to remove frames and videos that either will not be used or are no longer needed.

The first task of the frame/video analysis and deletion control module 350 is to analyze the captured frames for redundant frames that covey little new information to a viewer. The frame/video analysis and deletion control module 350 may identify redundant frames using a number of different methods. In one embodiment, the frame/video analysis and deletion control module 350 identifies nearby frames that have very similar color histograms as being redundant. Other well known methods of identifying very similar frames can be used such as motion vector correlation.

The identified redundant frames are removed from the frame store 340. Note that in a digital television environment, the frame/video capture control module 330 can sharply reduces the number of redundant frames by only capturing Intraframes (I-frames) that contain full image definitions. Other frames, such as p-frames, that are based upon other image frames are by their definition redundant.

An example of redundant video frames can be seen in the example of captured frames of FIG. 5. Referring to FIG. 5, the second and third video frames from the left in the row of frames captured from channel 4 (the first row) are redundant. Similarly, the first three frames captured from channel 5 (the second row) are redundant frames of a newscaster's "talking head". The frame/video analysis and deletion control module 350 deletes such redundant frames from the frame store leaving one representative frame. The redundant frames are deleted since the redundant frames do not convey much information to a viewer and such redundant video frames occupy valuable space on the frame store.

The frame/video analysis and deletion control module 350 also deletes frames and videos that may have been useful at one point but are now no longer needed. To determine which video frames should be removed from the frame store 340, the frame/video analysis and deletion control module 350 consults a set of display parameters 355. The display parameters 355 precisely define the how the visual program summary is generated. When the display parameters 355 determine that a particular image frame or video will never again be used to generate a visual program display then that particular image frame or video is deleted from the frame store 340.

Frame/Video Selection and Display Control

Referring back to FIGS. 2a and 2b, the main task of the control program 233 is to select frames and videos to composite and display in a frame buffer 250 in order to generate a visual program summary. The frames and videos may be real-time information that is received from the A/D stage in FIG. 2a (from the decoder stage 290 in FIG. 2b) or stored information from the frame store 240.

Referring to FIG. 3, the task of selecting frames and compositing a visual program summary is performed by the frame/video selection and display control module 360. The frame/video selection and display control module 360, accesses a set of display parameters 355 that precisely define the how the visual program summary should appear on the viewer's display. The display parameters 355 may be constrained by a number of different factors. For example, the available display screen resolution, the processing power available, and the individual viewer preferences may all determine how the display parameters 355 are set.

Figure 6:
FIG. 6 illustrates one embodiment of a visual program channel guide that illustrates a set of recent frames from available television program channels.

FIG. 6 illustrates a first example of a visual program summary that may be generated by the frame/video selection and display control module 360. The example visual program summary of FIG. 6 consists of a still frame based program summary wherein a series of recent still video frames from the available channels are displayed in a grid formation. Specifically, in the example of FIG. 6, each row contains the most recently captured non-redundant frames from the four channels depicted in FIG. 5.

In the example of FIG. 6, the different channel rows can be set up as selectable "hot spots" that may be selected using a cursor control device such as a mouse. When a user selects a particular row, the television system is instructed to tune in the desired channel. In an integrated television/visual program summary device system, the television simply adjusts the tuner to the selected channel. In an embodiment wherein the visual program summary device is a separate unit, the visual program summary device may emit infrared remote control signals that instruct the television to tune the desired channel.

The example of FIG. 6 provides only one possible visual summary that may be generated. As illustrated in FIG. 3, adjusting the set of display parameters 355 can control the generation of the visual program summary. For example, the set of display parameters 355 may specify how the individual still video frames should be selected for the each of the channel rows.

In one embodiment, each channel row of the visual program summary may comprise the last k non-redundant video frames wherein k may be the number of frames that can easily fit within the row. Such an embodiment is illustrated in the conceptual diagram of FIG. 7. In such an embodiment, the visual program displays the most recent non-redundant images captured for each available channel. Thus, the user would learn what types of images have recently been available on that channel.

Figure 7:
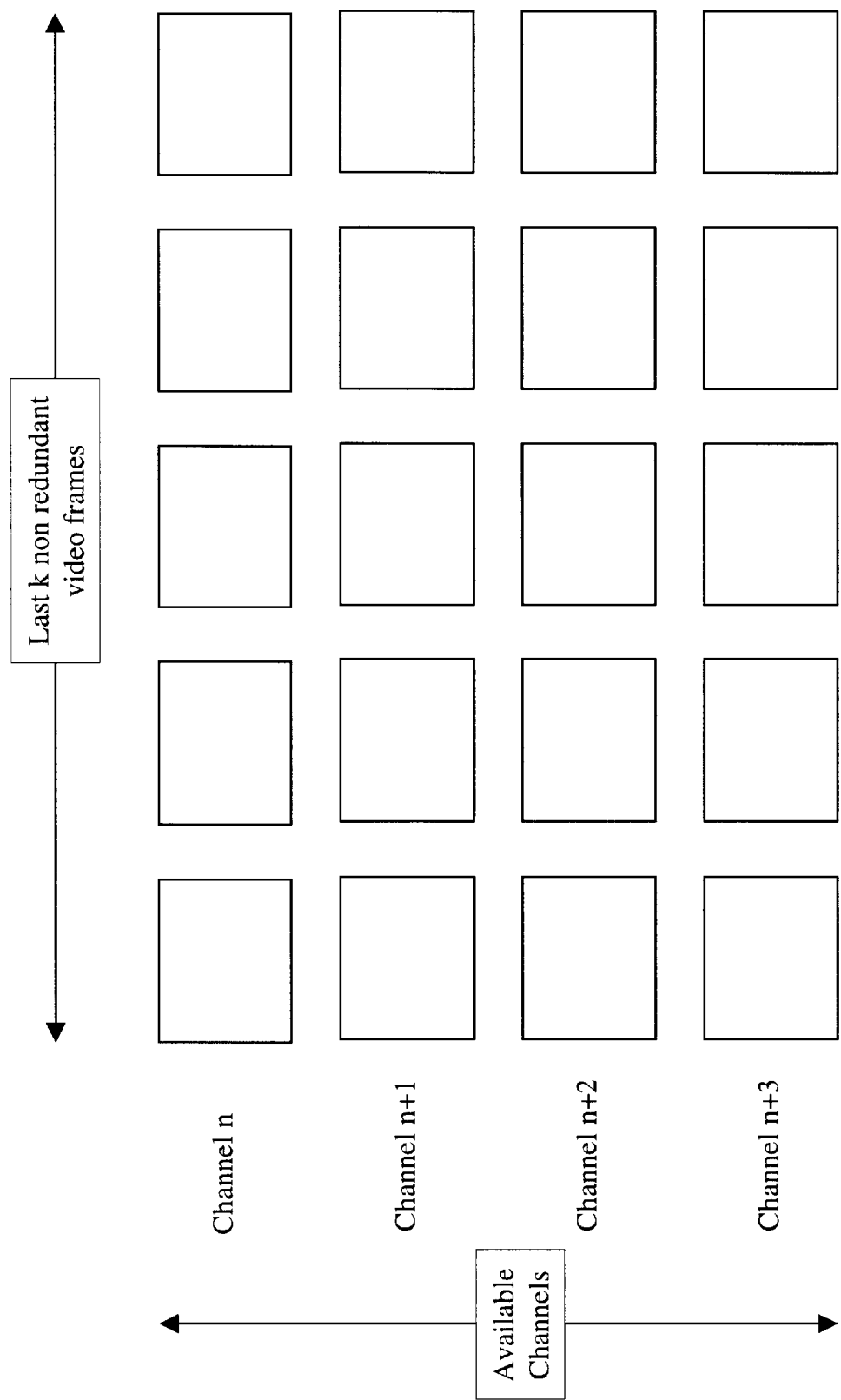
FIG. 7 illustrates a conceptual diagram that describes a visual program summary embodiment that displays the last k non-redundant image frames from available television program channels.

Unfortunately, the "most recent non redundant images" embodiment of FIG. 7 would vulnerable to commercial advertisement saturation. Specifically, a series of television commercial advertisements would quickly fill the available image slots such that a viewer would not be given any information about the feature presentation. Furthermore, programs with several fast scene cuts would also quickly fill all of the k available frame slots.

Figure 8:
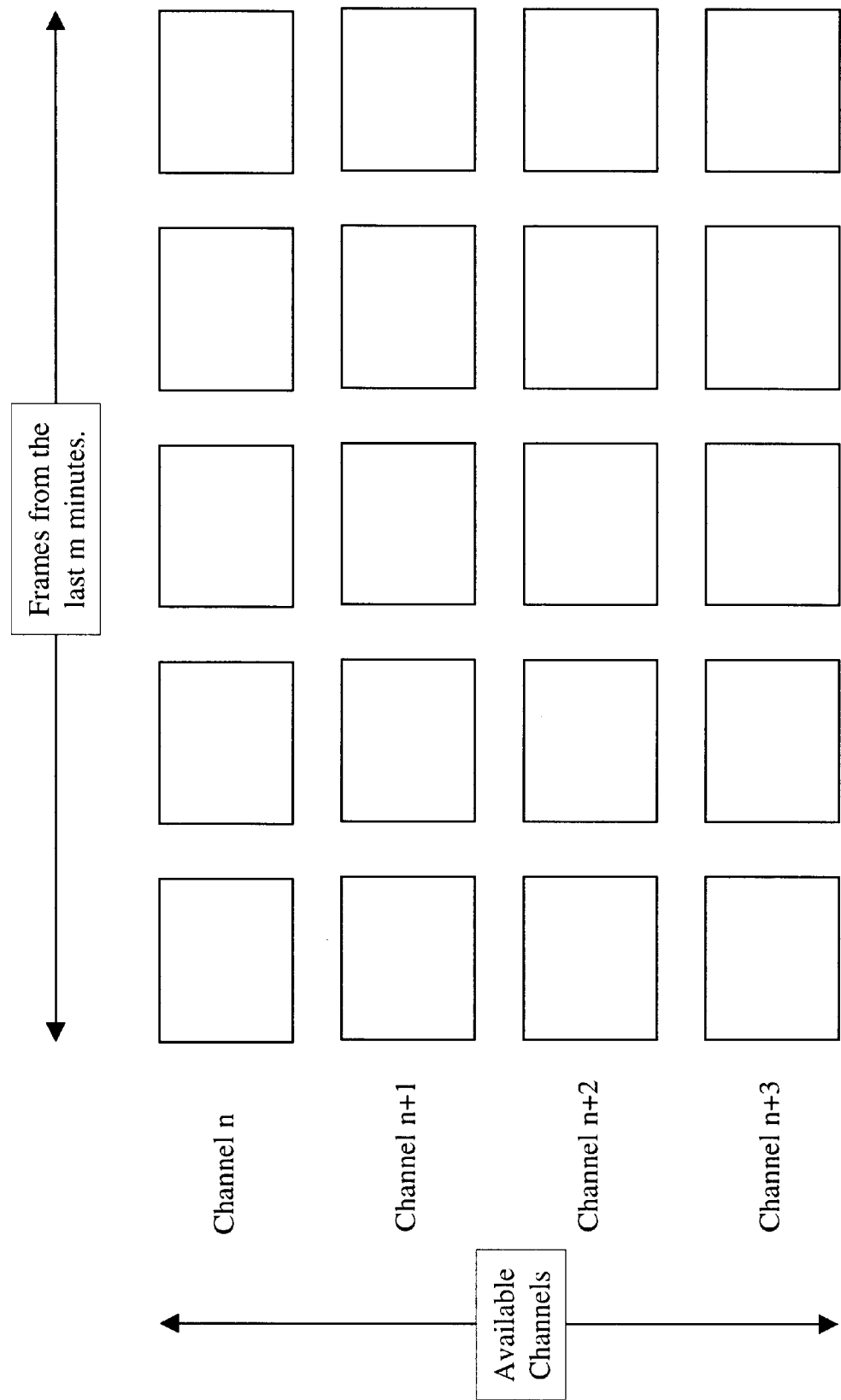
FIG. 8 illustrates a conceptual diagram that describes a visual program summary embodiment that displays a set of representative non-redundant image frames captured during the last m minutes from the available television program channels.

In another embodiment, each row of the visual program summary may comprise a set of non-redundant frames gathered at periodic intervals during the last m minutes. FIG. 8 illustrates such an embodiment. To generate a useful display, the image frames should be captured at times nearly uniformly spaced during the m minute time period. For example, in a five frame embodiment with a twelve minute window, the first frame would contain the most recently acquired video frame, the second frame would be from approximately three minutes ago, the third frame would be six minutes old, the fourth frame would be nine minutes old, and the fifth frame would be twelve minutes old.

In the FIG. 8 embodiment that displays captured images from uniformly spaced time periods, it would be very unlikely for the entire row of image frames to be filled with commercial advertisements. However, such as an embodiment may still contain images that are not useful to the viewer. For example, older images from a television program that already ended may be displayed. In one embodiment, such images may be eliminated by not displaying images that span across hour or half-hour boundary periods. For example, a program summary being generated at 8:04 pm may be configured not to display any image frames that were captured before 8:00 pm since such images may be from a previous television program.

To allow the best supply of images display, the present invention allows the display parameters 355 to be adjusted in order to obtain a desirable visual program summary. In most embodiments, the frames selected to generate a visual summary will lie between the extremes of FIG. 7 and FIG. 8. For example, in one embodiment, a subset of the available frame slots may be used to display the most recent n available non-redundant frames. The remainder of the frame slots may contain image frames from selected periods of times.

Other embodiments may incorporate additional rules into the display parameters 355 to generate a desired visual program summary. One rule that may be utilized is minimum scene length times. For example, one embodiment may select the last k frames from scenes that lasted at least five seconds. In this manner, very short scenes are eliminated since such scenes may not be important.

In one embodiment, the display parameters 355 are dynamically adjustable such that the viewer can specify the parameters of a desired visual program summary. The display parameters 355 can only be adjusted within the confines of the capture parameters 335. However, the capture parameters 335 may also be adjustable provided that limits are set such that the capture parameters 335 do not attempt exceed the capabilities of the tuner 310, frame capture 320, and the frame store 340.

To provide additional information to a user viewing the program summary, the control program may dynamically update the visual program summary while the view is viewing the visual program summary. For example, referring to FIG. 6, the left most image frame along each row may be periodically updated with newly captured image frames. The remaining image frames would move one position to the right and the right most image frame would be removed.

The visual program summary of the present invention may be supplemented with any additional information that is available. For example, in a digital television environment, the visual program summary may be supplemented with a television program name and program rating that is delivered along with the MPEG 2 encoded video information. In an Internet environment, the computer system may be able to access a server that contains a television program schedule. In such an environment, any information retrieved from such a server may be added to the visual program summary display.

Figure 9:
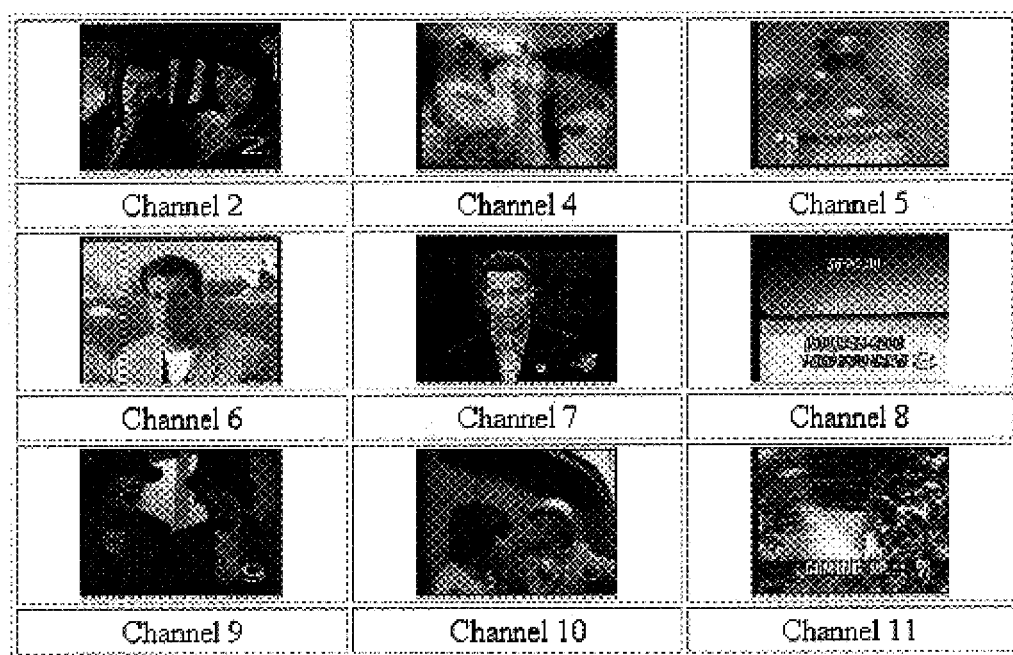
FIG. 9 illustrates one embodiment of a visual program channel guide that illustrates a set of animated videos from available television program channels.

The relatively static display of FIG. 6 represents only one possible display embodiment. In an alternate embodiment, the control program displays a dynamic set of channel summaries. FIG. 9 illustrates a snapshot of one possible example of such an embodiment. In the dynamic visual program summary of FIG. 9, a user can view the temporal dynamics associated with each channel. In this example of FIG. 9, nine different videos in the form of frames captured from nine available channels over the past N minutes are animated simultaneously.

In one embodiment, the videos are frame-reduced such that the videos have less than the normal number of frames. To the viewer, the experience is similar to watching all the channels simultaneously but in a "fast forward" mode such that the view gets to see the all the images from the last N minutes. The viewer can select the desired channel to start viewing that channel. Note that the system of the present invention continues to monitor and capture snapshot video frames such that the viewer can switch back to look at program summaries at any time and receive an overview of the TV programs from the past N minutes.

The foregoing has described a system for dynamically generating a television program summary. It is contemplated that changes and modifications may be made by one of ordinary skill in the art, to the materials and arrangements of elements of the present invention without departing from the scope of the invention.

We claim:

1. A method comprising:
repeatedly tuning at least one tuner at a regular interval of time to differing channels of a set of channels to receive video frames from each channel of the set of channels;
repeatedly capturing a plurality of sets of video frames, each set of video frames being comprised of a plurality of video frames received and captured from each channel of the set of channels as each channel is tuned to;
displaying a visual program summary comprised of at least two of the sets of video frames; and
repeatedly updating the at least two of the sets of video frames displayed by replacing those at least two of the sets of video frames displayed with at least two more recent sets of video frames received and captured from the same channels of the set of channels from which the at least two of the sets of video frames displayed were earlier received and captured as the same channels are repeatedly tuned.

2. The method of claim 1, further comprising displaying textual information concerning a video program received with at least one of the sets of video frames of the plurality of sets of video frames that depicts at least a portion of the video program.

3. The method of claim 1, wherein displaying the visual program summary further comprises accessing a program schedule and displaying information from that program schedule.

4. The method of claim 1, wherein displaying the visual program summary further comprises displaying video frames in a two-dimensional array, with sets of video frames from the plurality of sets of video frames being visually distinguished from each other in one dimension, and the progression of time for the sets of video frames from the plurality of sets of video frames being visually distinguished in the other dimension.

5. The method of claim 4, wherein the two-dimensional array is organized as rows and columns, with each row corresponding to a set of video frames from the plurality of sets of video frames, and each column corresponding to the passage of time for the sets of video frames from the plurality of sets of video frames such that newly captured video frames within each set of video frames is displayed in the left-most column, while progressively older video frames within each set of video frames are displayed in columns to the right of the left-most column.

6. The method of claim 1, further comprising deleting a first video frame from at least one set of video frames of the plurality of sets of video frames prior to displaying the at least one set of video frames if the first video frame is redundant to a second video frame also from the same at least one set of video frames.

7. The method of claim 6, wherein the color histograms of the first and second video frames are used to determine if the first video frame is redundant to the second video frame.

8. The method of claim 6, wherein motion vector correlation is used to determine if the first video frame is redundant to the second video frame.

9. The method of claim 1, further comprising deleting a video frame from at least one set of the plurality of sets of video frames if the at least one set of video frames spans a boundary such that the video frames of the at least one set of video frames span a plurality of video programs.

10. The method of claim 1, wherein the regular interval of time is adjustable.

11. The method of claim 1. wherein the set of channels excludes at least one channel that a viewer of the visual program summary has chosen to eliminate.

12. An apparatus comprising:
at least one tuner to repeatedly tune at regular intervals to differing channels of a set of channels to receive video frames from each channel of the set of channels;
a capture device coupled to the tuner to capture a plurality of sets of video frames, each set of video frames being comprised of a plurality of video frames received and captured each channel of the set of channels as each channel is repeatedly tuned to by the at least one tuner;
a processing device coupled to the capture device generating a visual program summary comprised of at least two of the sets of video frames wherein the at least two of the sets of video frames are repeatedly updated by replacing those at least two sets of video frames with at least two more recent sets of video frames received and captured from the same channels of the set of channels from which the at least two sets of video frames were earlier received and captured as the same channels are repeatedly tuned by the at least one tuner.

13. The apparatus of claim 12, wherein the capture device captures each frame that comprises at least one set of the plurality of sets of video frames at an adjustable interval.

14. The apparatus of claim 12, wherein the capture device stores at least one video frame of at least one set of the plurality of sets of video frames as a digital video frame.

15. The apparatus of claim 12, wherein the capture device comprises a television tuner and a video frame digitizer.

16. The apparatus of claim 12, wherein the processing device adds at least a portion of textual information received with at least one video program depicted within a set of video frames to the visual program summary.

17. The apparatus of claim 12, wherein the processing device accesses a program schedule and adds at least a portion of the information from that program schedule to the visual program summary.

18. The apparatus of claim 12, wherein the processing device deletes a first video frame from at least one set of the plurality of sets of video frames captured by the capturing device if the first video frame is redundant to a second video frame also from the same at least one set of video frames.

19. The apparatus of claim 17, wherein the color histograms of the first and second video frames are used to determine if the first video frame is redundant to the second video frame.

20. The apparatus of claim 17, wherein motion vector correlation is used to determine if the first video frame is redundant to the second video frame.

21. The apparatus of claim 12, wherein the processing device deletes a video frame from at least one set of the plurality of sets of video frames captured by the capture device if the at least one set of video frames spans a boundary such that the video frames of the at least one set of video frames span a plurality of programs.

22. The apparatus of claim 12, wherein the set of channels tuned at regular intervals by the at least one tuner excludes at least one channel that a viewer of the visual program summary has chosen to eliminate.

23. A computer readable medium comprising instructions, which when executed by a processor, causes the processor to:
repeatedly tune at least one tuner at a regular interval of time to differing channels of a set of channels to receive video frames from each channel of the set of channels;
repeatedly capture a plurality of sets of video frames, each set of video frames being comprised of a plurality of video frames received and captured from each channel of the set of channels as each channel is tuned to;
display a visual program summary comprised of at least two of the sets of video frames; and
repeatedly update the at least two of the sets of video frames displayed by replacing those at least two of the sets of video frames displayed with at least two more recent sets of video frames received and captured from the same channels of the set of channels from which the at least two of the sets of video frames displayed were earlier received and captured as the same channels are repeatedly tuned.

24. The computer readable medium of claim 23, further comprising causing the processor to display textual information concerning a video program received with at least one of the sets of video frame of the plurality of sets of video frames that depicts at least a portion of the video program.

25. The computer readable medium of claim 23, wherein the display of the visual program summary further comprises causing the processor to access a program schedule and display information from that program schedule.

26. The computer readable medium of claim 23, wherein the display of the visual program summary further comprises causing the processor to display video frames in a two-dimensional array, with sets of video frames from the plurality of sets of video frames being visually distinguished from each other in one dimension, and the progression of time for the sets of video frames from the plurality of sets of video frames being visually distinguished in the other dimension.

27. The computer readable medium of claim 26, wherein the two-dimensional array is organized as rows and columns, with each row corresponding to a set of video frames from the plurality of sets of video frames, and each column corresponding to the passage of time for the sets of video frames from the plurality of sets of video frames such that newly captured video frames within each set of video frames is displayed in the left-most column, while progressively older video frames within each set of video frames are displayed in columns to the right of the left-most column.

28. The computer readable medium of claim 23, further comprising causing the processor to delete a first video frame from at least one set of the plurality of sets of video frames if the first video frame is redundant to a second video frame also from the same at least one set of video frames.

29. The computer readable medium of claim 28, wherein the color histograms of the first and second video frames are used to determine if the first video frame is redundant to the second video frame.

30. The computer readable medium of claim 28, wherein motion vector correlation is used to determine if the first video frame is redundant to the second video frame.

31. The computer readable medium of claim 23, further comprising causing the processor to delete a video frame from at least one set of the plurality of sets of video frames if the at least one set of video frames spans a boundary such that the video frames of the at least one set of video frames span a plurality of programs.

32. The computer readable medium of claim 23, wherein the regular interval of time is adjustable.

33. The computer readable medium of claim 23, wherein the set of channels excludes at least one channel that a viewer of the visual program summary has chosen to eliminate.

* * * * *